Figure 1:
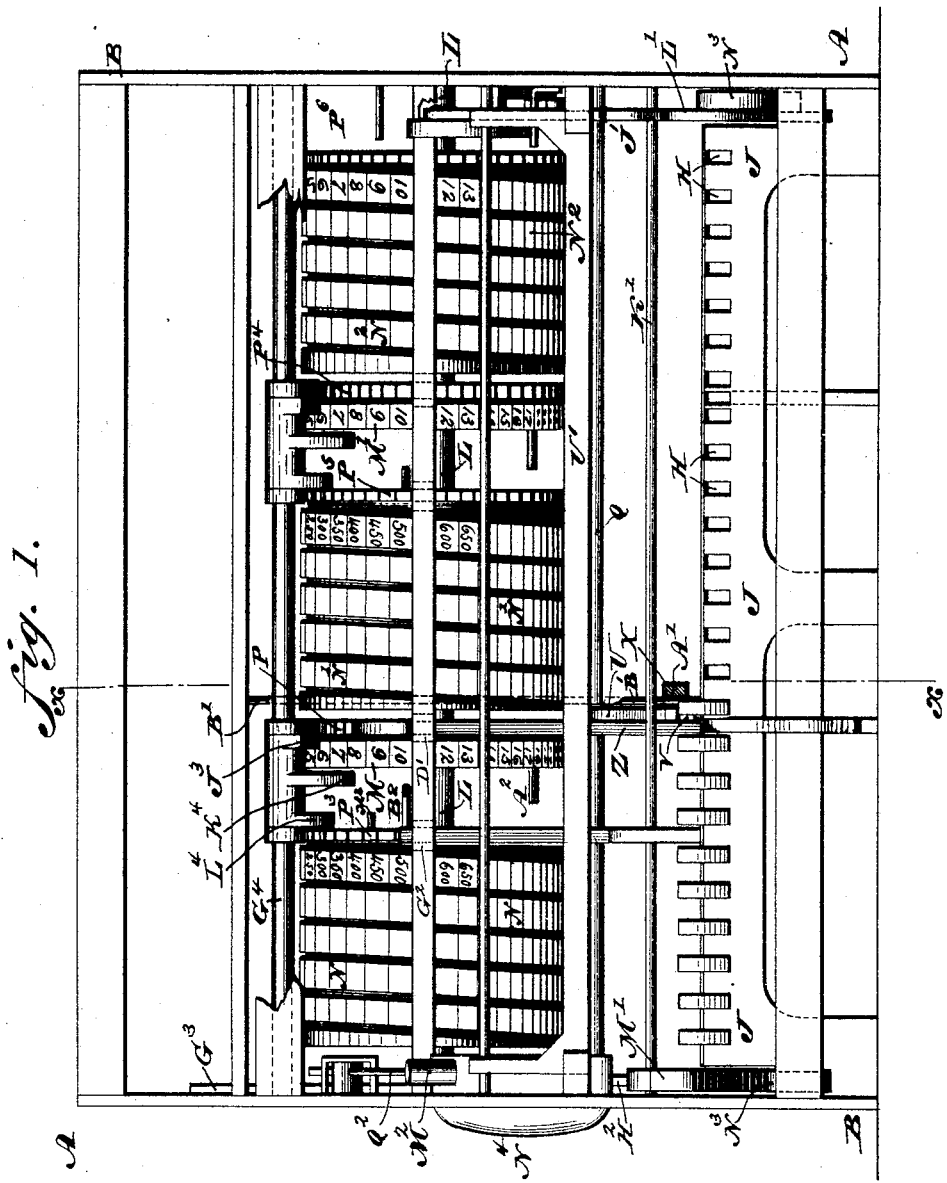

(No Model.) 4 Sheets—Sheet 1.

G. F. KOLB.
CASH REGISTER.

No. 457,727. Patented Aug. 11, 1891.

WITNESSES:
L. Douville,
Robt Aiton

INVENTOR,
George F. Kolb,
BY
ATTORNEY.

(No Model.)  G. F. KOLB.  4 Sheets—Sheet 2.
CASH REGISTER.
No. 457,727.  Patented Aug. 11, 1891.
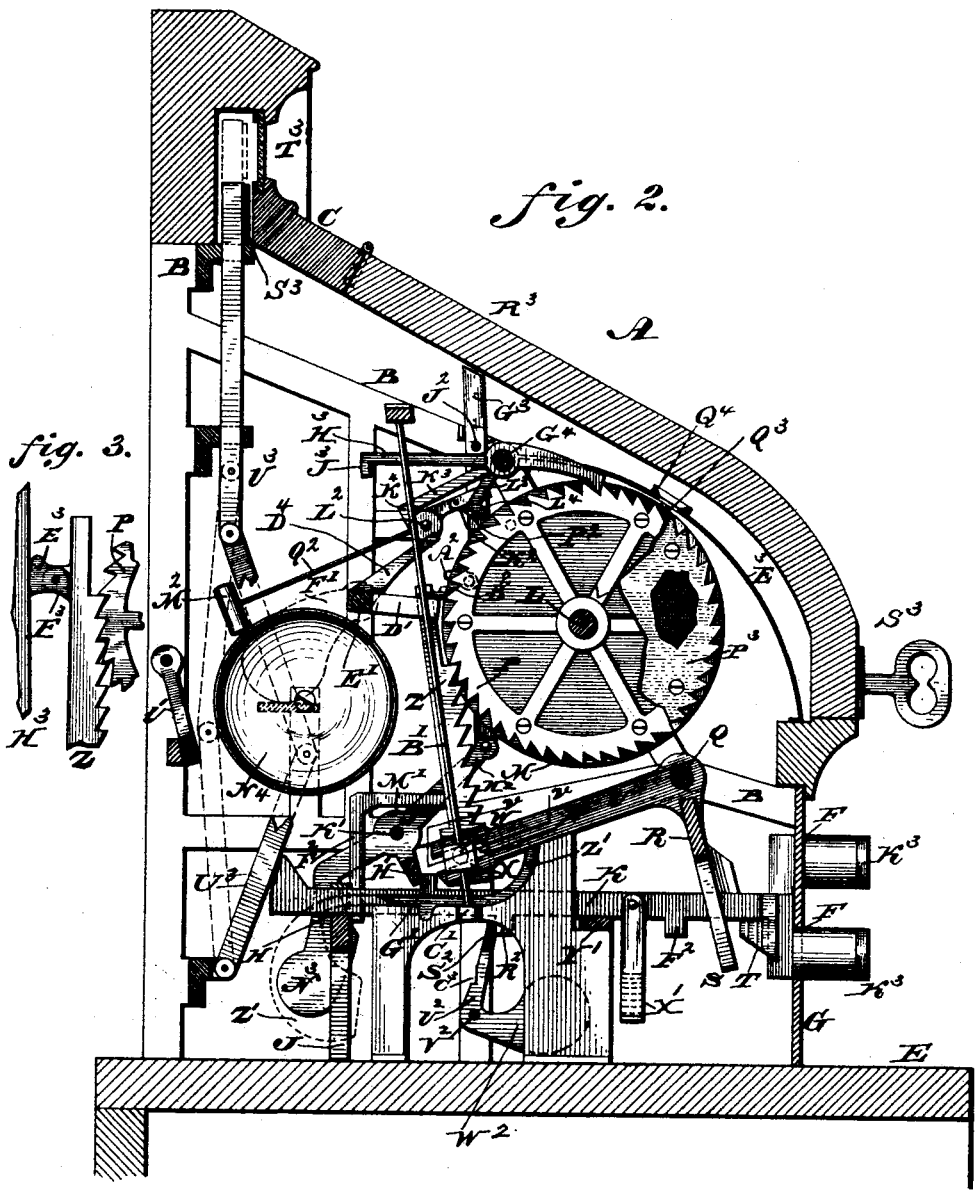
WITNESSES:  INVENTOR
George F. Kolb
BY
ATTORNEY.

(No Model.) 4 Sheets—Sheet 3.
G. F. KOLB.
CASH REGISTER.
No. 457,727. Patented Aug. 11, 1891.
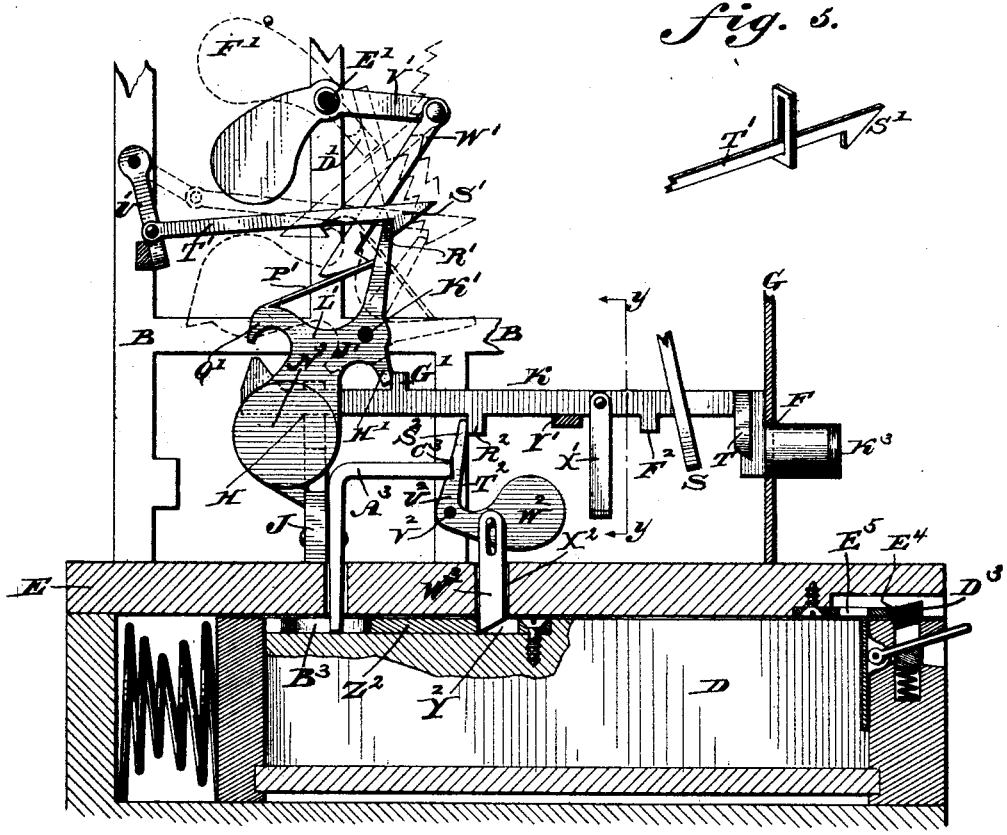
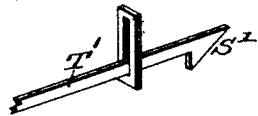
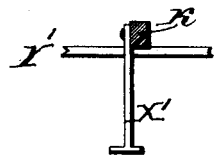
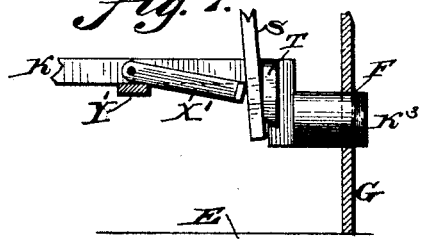
WITNESSES: 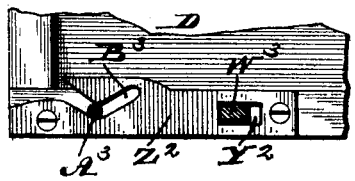 INVENTOR
George F. Kolb,
BY
ATTORNEY.
THE NORRIS PETERS CO., PHOTO-LITHO., WASHINGTON, D. C.

(No Model.) 4 Sheets—Sheet 4.
G. F. KOLB.
CASH REGISTER.
No. 457,727. Patented Aug. 11, 1891.
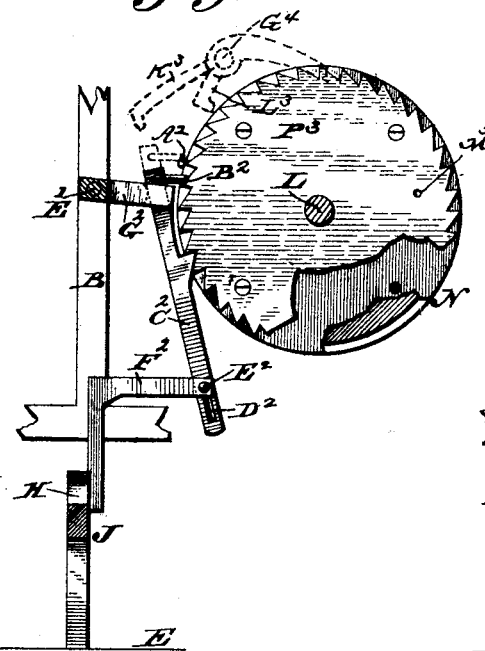
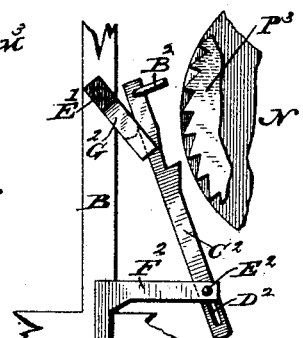
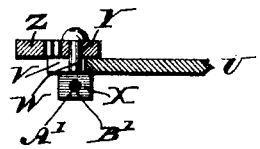
WITNESSES:
L. Douville,
Robt. Aiton.
INVENTOR
George F. Kolb
BY John A. Guedesheim
ATTORNEY.

UNITED STATES PATENT OFFICE.

GEORGE F. KOLB, OF PHILADELPHIA, PENNSYLVANIA.

CASH-REGISTER.

SPECIFICATION forming part of Letters Patent No. 457,727, dated August 11, 1891.

Application filed May 10, 1890. Serial No. 351,233. (No model.)

*To all whom it may concern:*

Be it known that I, GEORGE F. KOLB, a citizen of the United States, residing in the city and county of Philadelphia, State of Pennsylvania, have invented a new and useful Improvement in Cash-Registers, which improvement is fully set forth in the following specification and accompanying drawings.

My invention relates to improvements in cash-registers; and it consists, first, of means, substantially as described, connected with the key-bars for limiting the raising of the rack-bar to the proper height for moving the ratchet-wheel the required distance; second, of a rising and falling rack for rotating the ratchet-wheel, said rack having a pivotal connection with an operating-arm, substantially as described; third, of mechanism, substantially as described, for releasing the pivoted rising and falling rack-bars from contact with their ratchet-wheels; fourth, of means for insuring the engagement of the rack-bars and ratchet-wheels of the device on the return movement of the key-bars; fifth, of an alarm-operating device, substantially as described; sixth, of a pivoted arm interposed between the operating-arm of the registering-wheel rack-bar and the support for the outer end of said arm; seventh, of means, substantially as described, for limiting the inward movement of the key-bars; eighth, of mechanism, substantially as described, for partially rotating the drum at each revolution of the register-wheel, and, finally, of the combination of parts herein described.

Figure 1 represents a rear view of a register embodying my invention, the back casing and indicating-tablets with their levers being omitted. Fig. 2 represents a sectional view in elevation on line $x\ x$, Fig. 1. Fig. 3 represents a side view of a modification of the mechanism for engaging the rising and falling rack-bars with their ratchet-wheels. Fig. 4 represents a partial end view of the device with drawer, the casing being removed. Fig. 5 represents a perspective view of a detail portion of the device. Fig. 6 represents a vertical section on line $y\ y$, Fig. 4. Fig. 7 represents a side view in elevation of the parts shown in Fig. 6, the swinging arm being in engagement with a finger of the comb-plate. Fig. 8 represents a plan view of a corner of the drawer with slotted plate thereon. Figs. 9 and 10 represent side views of portions of the ratchet-wheel on the end of the drum with mechanism for partially rotating the same at each revolution of the registering-wheel, the mechanism being in different positions in the two figures. Fig. 11 represents an irregular section on line $v\ v$, Fig. 2. Fig. 12 represents a detail view in elevation, showing the bell and mechanism for operating the same. Fig. 13 represents a detail perspective view of part of the bell mechanism.

Similar letters of reference indicate corresponding parts in the several figures.

Referring to the drawings, A designates a cash-register having a frame B, with casing C, and a drawer D below the base E of the same. Guided in the openings F in the front plate G and in openings H in a rear supporting-piece J, which is secured at its ends to the sides of the frame B, are the key-bars K, having their front ends $K^3$ of same diameter or cross-sectional thickness as the face end proper of said keys, as shown, whereby the insertion of any object between the head thereof and the front plate is prevented, and thereby the ringing of the bell without a registry avoided. Loosely mounted on the shaft L, which has its ends secured in the ends of the frame B, are the register-wheels M M' for cents and dimes, respectively, and the spirally-grooved drums N N' $N^2$ for cents, dimes, and dollars, respectively, representing totals of fractional currency registered. On one side of each of said wheels and drums is secured one of the ratchet-wheels P $P^3$ $P^4$ $P^5$ $P^6$.

As the construction and operation of the mechanism for rotating each register-wheel and its respective drum are similar, it will only be necessary to describe the construction and operation of the mechanism for operating one set or a register-wheel and its attendant drum.

Freely mounted on a shaft Q, which is parallel with the shaft L, is a comb-plate R, having the downward-projecting fingers S, adapted to be engaged by the projections T on the key-bars K. The said projections T are connected with said bars so as to move the said comb-plate different distances, according to the number to be registered. Connected with the comb-plate R is a rearward-extending arm U, having a slot V in its end, through which is passed the pin W of a block X. The end of the said pin is loosely inserted in an opening Y in the lower end of a rising and falling rack-bar Z, sustaining the latter, the teeth of said rack-bar being adapted to engage with the teeth of the ratchet-wheel P of the register-wheel M. The block X is provided with an opening A', through which passes a guide-rod B', having its lower end in a recess in the supporting-piece C' and its upper end properly held in a cross-bar of the frame B. The upper end of the rack-bar Z is held loosely between the forked end of an arm D', which is secured to a rock-shaft or oscillating bar E', having journal-bearings in the ends of the frame B, and provided with a weighted arm F' for moving it and the arm D', so as to force the said rack-bar Z into engagement with the ratchet-wheel P, and thereby place the said bar in position to partially rotate the said wheel when the said rack-bar is raised. To permit the disengagement of the rack-bar from the ratchet-wheel and its fall or descent, the following-described mechanism is employed. On the key-bars K are the projections G', adapted to contact with the lower cross-bar H' of the oscillating frame J', which is loosely mounted on the shaft K', secured to the ends of the frame B. The frame J' is formed of the end pieces or plates L' M', each having weighted rear portions $M^3$, and the piece or plate L' is formed at its upper end with a straight edge P', having at its rear end a downward-inclined hooked projection Q' and at its front end an upward projection R', the latter adapted to be engaged by the hook S' of the lever T', which is pivoted to a swinging frame U' in the rear portion of the register and adapted to lower the indicator-tablets.

The rock-shaft E' is provided near one end thereof with an arm V', to which is pivoted an arm W', having a hooked lower end adapted to ride on the straight edge P' and be engaged by the hooked projection Q', so that the vibrations of the frame J' will oscillate the bar E', and thus either lower or raise the arm D', so as to either release the rack-bar from engagement with the ratchet-wheel or force the same in contact therewith.

To limit the movement of the comb-plate R and its arm U, so that the said arm will raise the rack-bar no more than the desired distance, the swinging arms X' are provided, the said arms being pivoted to the key-bars K and adapted to be raised by contact with a cross-bar Y', secured at its ends to the frame B, so that the ends of the said arms X' will come in contact with the fingers S of the comb-plate, and thus prevent the further movement of the same. The projections $F^2$ on the key-bars, adapted to come in contact with the stationary cross-bar Y', prevent the further movement of said key-bars.

An angle-arm Z', weighted at its lower end, is pivotally hung on the upper edge of the supporting-piece C' of the frame, between the same and the arm U, so that the said arm U will not be suddenly stopped in its downward motion.

The carrying device is as follows: To one side of the register-wheel M a projecting pin $A^2$ is secured, which is adapted to come in contact at each revolution of the said wheel with a projecting portion $B^2$ of a rising and falling toothed bar $C^2$, having a slot $D^2$ in its lower end, and through which slot passes a pin or stud $E^2$, secured in the arm $F^2$ of the cross-piece J of the frame. The upper end of the said rack is loosely held in the bifurcated end of an arm $G^2$ of the oscillating bar E', so that it is first released from and then brought in contact with the ratchet-wheel $P^3$ of the drum N during the return movement of a key-bar, and thereby the said rack-bar $C^2$ brought in proper position to be lifted by the pin $A^2$ when the latter comes in contact therewith, and so move the ratchet $P^3$ of the drum the space of one tooth. To reliably insure a striking of the bell on the pushing in of each key-bar, a rod $G^3$ is pivotally connected with an arm $H^2$ of the plate M', so that it will be successively lowered and raised by the oscillation of said plate. The upper end of the said rod is guided in ways in the frame B and has a projecting pin $J^2$, adapted on the lowering of the rod to come in contact with and depress the pivoted arm $K^2$, secured to a rear projecting portion $K^5$ of a hammer-arm $Q^2$, said arm $K^2$ being rotatable on the stud $L^2$, secured to the frame B, and carrying the hammer-arm $M^2$ of the gong or bell $N^4$. The under side of the said arm $K^2$ bears against a pin $P^2$, projecting from a rear portion $K^5$ of the hammer-arm, so that said arm $K^2$ in its downward motion raises the hammer-arm $Q^2$ until the arm $K^2$ is so depressed or lowered that its outer end is disengaged from the pin $J^2$, when the hammer falls and strikes the bell. On the raising of the rod $G^3$ the arm $K^2$ is raised, so that the pin $J^2$ passes above the end thereof, when the arm $K^2$ drops and rests on the pin $P^2$ of the hammer-arm. It will be seen that the hammer-arm is raised at the commencement of the inward moving of a key-bar, and whether the said movement is completed or not the hammer will fall, and thus ring an alarm, when the pressure is removed from the key, owing to the raising of the rod $G^3$ by the oscillation of the weighted plate M' with the frame J' and the removal of the pin $J^2$ from contact with the arm $K^2$.

On the key-bars K are the projections $R^2$ in contact with the upper cross-bar $S^2$ of a swinging frame $T^2$, having the end plates or pieces $U^2$, loosely mounted on a stationary shaft $V^2$, which is secured to the frame B, so that the inward movement of a key-bar oscillates the said frame and raises the weighted lower arms $W^2$ thereof, one of which has pivotally attached thereto a locking-bolt $W^3$, adapted to be inserted in the elongated opening $X^2$ in the base E and the slot $Y^2$ in the plate $Z^2$ on the upper edge of the drawer-frame. To lock the key-bars and prevent the pushing in of the same, the bar $S^2$ is locked in position by means of an angular lever or arm $A^3$, pivotally attached to the frame B or an attachment thereof and having its lower end adapted to move in a curved slot $B^3$ in the plate $Z^2$ of the drawer D and its upper end either in a notched portion $C^3$ of the back of one of the plates $U^2$ to lock said bar $S^2$ or out of engagement with the said plate, so as to release the said bar. Each of the slots $Y^2$ and $B^3$ is of such length as to permit a farther pushing in of the drawer after the insertion of the locking-bolt $W^3$ in the opening $X^2$ and slot $Y^2$ and the lower end of the lever $A^3$ in the curved slot $B^3$ for the purpose of locking the said drawer by the bolt $D^3$ in the front thereof.

To aid in resetting or returning to the starting-points each set of register-wheels and drums a lever-plate $E^3$ is employed. The said plate is loosely mounted on the shaft $G^4$, secured in the ends of the frame B, and is provided with a rearwardly-extending arm $H^3$, having a finger $J^3$, adapted to contact with an arm $D^4$ of the rock-shaft $E'$ and depress the same, so that the rack-bars in contact with the ratchet-wheels of the device are released from engagement therewith, and thereby permit the register-wheels and drums to be rotated, as desired. The plate is also provided with the arms $K^3$, having fingers $K^4$, adapted to be in contact with the pin $A^2$, and the arms $L^3$ and fingers $L^4$, adapted to be in contact with a pin $M^3$ on the ratchet-wheel of the drum when the registering-wheels and drums are rotated until the zero-spaces thereon are in line with the slots or recesses $Q^3$ in the front portion of the said plate.

The indicator-tablets $S^3$ correspond in number to the key-bars and move in ways connected with the frame B, the numbers on their upper ends being seen at the opening $T^3$ of the casing. The jointed levers $U^3$, pivoted to the lower end of each of the tablets $S^3$ and to the frame B, serve, when pushed in or toward the back of the device, to raise said tablets, and the cross-bar of the weighted swinging arm $U'$ bearing against the jointed lever lowers the same with the tablets.

The rear end of the key-bar K has its inclined contact-face formed at a different angle from that of the side of the lower operating-arm of the tablets when the said arm is lowered, so as to first contact therewith at a single point, and as it rises said arm has more of said inclined end in contact therewith, so as to give increased bearing-surface toward the end of the strike, it being noticed that the first contact-surface is farther from the pivot of the arm, thus affording greater leverage to the operating-bar.

The operation of the device is as follows: The parts being in their normal positions, when it is desired to register a unit, a ten, or a hundred, indicative of cents, dimes, and dollars, the key of the respective denomination desired is pushed inward, so that the projection T on the bar K is brought in contact with a finger S of the comb-plate R, thereby partially rotating it and lifting its arm U a distance according to the numbers desired to be registered, thereby raising the rack-bar Z and partially rotating the ratchet-wheel P and register-wheel M, so as to bring the number on the wheel the same as on the key operated at the opening $Q^3$. The bar Z when rising is guided in the forked arm $D'$, so that it is prevented from undue motion in the direction of the length of the register, and thereby out of engagement with the wheel, while its lower end, secured to the block X, is held in line by means of the guiding-rod $B'$, on which the said block X moves in its rising and falling motions. As the key-bar is pressed inward, its projection $G'$ comes in contact with the bar $H'$, so as to oscillate the frame $J'$ and the end plates $L'$ and $M'$ thereof. The hooked arm $W'$, riding on the straight edge $P'$, is raised until it is engaged by the hooked projection $Q'$ on the plate $L'$. The end plate $M'$ being oscillating, depresses the arm $H^2$ and the connected rod $G^2$, so as to lift by means of the pin $J^2$ and the arm $K^2$ the hammer-arm $M^2$ of the bell. The pin $J^2$ of the said rod $G^2$ is so located that just before the end of the inward movement of the key-bar the arm $K^2$ is released therefrom, and thus permits the fall of the hammer and the striking of the bell. As the key is being pressed inward, the swinging arm $X'$ is raised by contact with the bar $Y'$, so that its lower end is brought in contact at the proper time with a finger S of the comb-plate, thereby preventing a further rotation of the same and the elevation of the arm U thereof; and the projection $F^2$ on the key-bar comes in contact with the bar $Y'$, thus stopping the further inward movement of the said key. The bar $S^2$ of the frame $T^2$ is also swung back by the contact of the projection $R^2$ of the key-bar therewith, so that the arm $W^2$ is raised and the bolt $W^3$ withdrawn from the opening $X^2$ in the base E and the slot $T^3$ in the plate on the drawer-frame. When the pressure is removed from the key, the weighted arms $N'$ of the plates $L'$ $M'$ will cause the oscillation of the frame $J'$ and the bar $H'$, so that the said bar will bear against the projection $G'$, and so force the keys outward, or to their normal position. During the first part of the outward movement of the key-bar the hooked end of the lever $W'$ is drawn by the projection $Q'$, so that the bar $E'$ is oscillated and the rack-bar permitted to fall backward from the ratchet-wheel P, the line of said bar when in contact therewith being out of vertical direction, and thereby permitted to descend, carrying with it the end of the arm U. When this is accomplished, the hook-lever $W'$ becomes free from the projection $Q'$ and the weighted arms $F'$ of the bar oscillate the arm $D'$ so as to re-engage the rack-bar with the ratchet-wheel. In registering additional numbers when the number to be added to that already indicated by the registering-wheel will make the total to be in excess of the highest number thereon, as the said registering-wheel rotates it will carry the pin $A^2$ thereon so that it comes in contact with the under side of the projection $B^2$ of the rack-bar $C^2$, and thereby lift the same and rotate the ratchet-wheel $P^3$ of the drum N, with which it is in engagement, the distance of one tooth. The oscillation of the bar $E'$ then lowers the arm $G^2$, so that the said rack-bar is released from engagement with the ratchet-wheel and permitted to fall, so as to be in position to again move its ratchet-wheel when the pin $A^2$ contacts with the projection $B^2$ thereof, the pin and slotted connection of said rack-bar with the arm of the frame allowing the said rising and falling motions the distance of one tooth. Loosely fitting in the spiral groove of each of the drums N is the pin $Q^3$ of a slide $Q^4$, the latter having an opening therein, through which may be seen the total figures registered of the different denomination of its drum.

When it is desired to lock the device, so as to close both the drawer and prevent tampering with the keys, the drawer is pushed inward, the bolt $D^3$ being first withdrawn from the opening $E^4$, so that the lower end of the angular lever $A^3$ passes the curved portion of the slot and is at the closed end thereof, the upper end of the said lever then being against the back of the plate $U^2$ at the end of the bar $S^2$, so as to hold the said bar against the projection $R^2$ of the key-bars, thus preventing the movement of the latter, the bolt $D^3$ being then inserted in an inner opening $E^5$. The front upper portion of the casing is provided with a lid $R^3$ and lock $S^3$.

In Fig. 3 is shown a modification of the mechanism for releasing and engaging the rack-bar and ratchet-wheel, the said modification consisting of a cam $E^3$, pivoted to an arm $F^3$ of the rack-bar and adapted to bear against a stationary piece $H^3$, secured to the frame B, when the rack-bar is being raised, so as to force the latter into engagement with the ratchet-wheel; but when the rack-bar is falling permitting the same to fall away from the wheel.

Having thus described my invention, what I claim as new, and desire to secure by Letters Patent, is—

1. In a register, the combination of a horizontal inwardly-moving key-bar, a swinging arm operated by the movement of said key-bar, a rising and falling rack-bar connected with said arm, and a registering-wheel with a ratchet-wheel, substantially as and for the purpose set forth.

2. The combination of a key-bar, a swinging arm operated by the movement of said key-bar, a rising and falling rack-bar connected with said arm, an oscillating bar with an arm contacting with said rack-bar, and a registering-wheel with a ratchet-wheel connected therewith, substantially as described.

3. The combination of a key-bar, a swinging arm operated by the movement of the key-bar and having a slot in one end thereof, a rack-bar, a block having a stud passing through the slot of the arm and loosely connected with the rack-bar and provided with an opening, a guide-rod having suitable supports and passing through said opening, and a support for the upper end of the rack-bar, and a register-wheel with a connected ratchet-wheel, substantially as described.

4. The combination of a key-bar, a swinging arm operated thereby, a rack-bar pivotally connected with said arm, an oscillating shaft with a guide-arm embracing said rack-bar, a rotary ratchet-wheel, and mechanism, substantially as described, for limiting the inward movement of the key-bar, as stated.

5. The combination of key-bars, a swinging comb-plate with fingers thereon and a rising and falling arm connected therewith, a rising and falling rack-bar pivotally connected with said arm, a supporting-piece for the end of said arm, and a ratchet-wheel, substantially as described.

6. The combination of a key-bar, an oscillating comb-plate adapted to contact with said key-bar and provided with an extending arm having a rising and falling rack-bar pivotally connected therewith, a ratchet-wheel rotated by said rack-bar, a support for the end of said arm connected with said rack-bar, and a weighted angle-arm having one limb between said comb-plate arm and said support, substantially as and the purpose set forth.

7. The combination of a frame, operating key-bars, a comb-plate with fingers and an arm, the said fingers adapted to contact with projections on the key-bars, a rack-bar pivotally connected with the said arm and having its pivotal pin passing through a slot in the said arm and secured to a block, a rod on which said block is guided in the movements of the arm, and a ratchet-wheel, substantially as described.

8. The combination of an oscillating arm with a slot therein, a rack-bar, a block with a pin passing through said slot and lower end of said rack-bar, a ratchet-wheel, an oscillating bar with forked arm embracing the upper end of said ratchet-wheel, and a guide for said block, substantially as described.

9. The combination of an oscillating comb-plate with a rearward-extending arm, a movable support for the outer end thereof, and a pivoted angle-arm weighted at its lower end and having a limb between the said rearward-extending arm and a stationary supporting-piece, substantially as and for the purpose described.

10. The combination of operating-keys, a comb-plate with depending fingers and a projecting arm, a registering-wheel with a ratchet-wheel connected therewith, a rack-bar pivotally connected with said arm and adapted to engage said ratchet-wheel, and mechanism, substantially as described, connected with said key-bars and operated by contact with a cross-bar for limiting the movement of said comb-plate, substantially as described.

11. The combination of operating-keys, a comb-plate with depending fingers and a projecting arm, a rack-bar pivotally connected with said arm, a ratchet-wheel meshing with said rack-bar, swinging arms connected with said key-bars and adapted to bear against the fingers of said comb-plate, and a cross-bar adapted to raise said swinging arms, substantially as described.

12. The combination of an operating key-bar having an inclined inner end and a tablet with levers, the angle of the contact side of the lower member of the tablet-levers being when the tablet is lowered different from that of the inclined face on the contact end of the key-bar, substantially as and for the purpose set forth.

13. The combination of an operating key-bar and a front plate with an opening therein, the front or projecting ends of said key-bars being of a thickness or diameter equal to the face end of the key-head, substantially as and for the purpose set forth.

14. The combination of an operating key-bar, a pivoted arm, a rising and falling rack-bar pivotally connected with said arm, a ratchet-wheel rotated by the rising movement of said rack-bar, and an oscillating frame with an arm intermittently embracing the rack-bar, said parts being combined, substantially as described.

15. The combination of a key-bar with a projection thereon, a pivoted arm adapted to be raised and lowered by the movement of said key-bar, a rack-bar pivotally connected with the said arm, a ratchet-wheel rotated by the rising movement of said rack-bar, and mechanism, substantially as described, operated by contact with said projection on the key-bar and inward movement thereof for placing the said rack-bar in engagement with the said ratchet-wheel, substantially as described.

16. The combination of a key-bar with a projection thereon, an arm having one end adapted to be raised and lowered by the movement of said key-bar, a rack-bar pivoted to said end of the said arm, a ratchet-wheel rotated by the rising movement of said arm and rack-bar, an oscillating frame having a cross-bar engaged by said projection on the key-bar and provided with a hooked projection, and an oscillating cross-bar having an arm adapted to embrace the upper end of the rack-bar and provided with a pivoted lever with hooked end adapted to engage the hooked projection on the oscillating frame, substantially as and for the purpose set forth.

17. The combination of key-bars, each having a projection thereon, an arm having one end adapted to be raised and lowered different distances by the movements of said key-bars, a rack-bar pivotally attached to said arm and raised and lowered therewith, a registering-wheel with a ratchet-wheel secured thereto, an oscillating frame with a cross-bar adapted to be engaged by said projections on the key-bars and having an end plate with a straight-line edge and a downward-projecting hook, an oscillating bar having an arm guiding the rack-bar and provided with a weighted arm, and a pivoted lever with a hook end, the latter adapted to ride on said straight edge of the oscillating frame and engage with the said hooked projection thereof, substantially as described.

18. The combination of an operating key-bar, an arm having one end raised and lowered by the movement of said key-bar, a rack-bar pivotally connected with said end and raised and lowered therewith, a registering-wheel with a ratchet-wheel connected therewith, a swinging frame adapted to be oscillated during the movement of said key-bars, an oscillating bar having an arm adapted to raise said rack-bar into operative contact with said ratchet-wheel, and mechanism, substantially as described, connected with said oscillating bar and frame for raising the arm on the said oscillating bar as the cross-bar of the oscillating frame is moved backward, substantially as and for the purpose set forth.

19. The combination of an operating key-bar with a projection thereon, a swinging frame with a cross-bar and an end plate having a weighted arm projecting on one side of the journal thereof and an arm on the opposite side, a rising and falling rod pivotally connected with said last-mentioned arm, a pin on the upper part of said rod, a bell, a hammer-arm pivoted on a stud, and a short arm pivoted on said stud and normally resting on a pin projecting from the side of the rear portion of the hammer-arm, substantially as and for the purpose set forth.

20. The combination of a bell, a stud with a hammer-arm pivoted thereon, a short arm pivoted on said stud and normally resting on a pin in the rear end of the hammer-arm, a rising and falling rod with a pin adapted to contact with the upper side of the said short arm so as to lower the same and raise the hammer-arm, an oscillating frame with an arm connected with said rod, and an operating key-bar for said frame, substantially as and for the purpose set forth.

21. The combination of a bell, a pivoted hammer-arm, a short arm mounted on the pivot of the hammer-arm and normally resting on a stud or projection of the rear end of the hammer-arm, a rising and falling rod with a pin thereon, said pin being so located as to permit the release of the said short arm, an oscillating frame with an arm connected with said rod, and an operating key-bar for said frame, as and for the purpose described.

22. The combination of a rotary wheel with a pin thereon, a bar having a slot in its lower end and provided with a projection adapted to be engaged by said pin, a sustaining-pin for said rack-bar passing through said slot, a rotary ratchet-wheel engaging with said rack-bar, an oscillating frame with arm connected with said rod, and an operating key-bar for said frame, substantially as described.

23. The combination of a rotary wheel with pin thereon, a rack-bar having a slot in its lower end, a sustaining-pin for said rack-bar in said slot, and an oscillating bar with arm sustaining the upper end of said rack-bar, the pin of said rotary wheel being adapted to engage and raise said rack-bar, substantially as described.

24. The combination of a frame, a stationary shaft, a plate loosely mounted thereon and having a slot in its front portion and an arm on its rear portion, a rotary registering-wheel with a ratchet-wheel connected therewith, and an oscillating arm supporting a rack-bar in engagement with said ratchet-wheel, the said arm of said plate being adapted to depress the said supporting oscillating arm and release the said rack-bar from engagement with said ratchet-wheel, substantially as described.

25. The combination of a frame, a stationary shaft, a plate loosely mounted on said shaft, a registering-wheel connected with a ratchet-wheel and having a projecting pin, a drum with a ratchet-wheel, rising and falling rack-bars engaging said ratchet-wheels, an oscillating bar with arms supporting said rack-bars, the said pin of the registering-wheel being adapted to contact with and lift the rack-bar engaging the ratchet-wheel of the drum, and said plate having an arm adapted to lower the arm of the said oscillating bar, and thereby release the rack-bars from their ratchet-wheel, and an arm adapted to contact with the pin on the registering-wheel, substantially as and for the purpose set forth.

26. In a registering device, a swinging resetting-plate having an arm on its rear portion adapted to lower a supporting-arm of a rack-bar thereof, an arm adapted to engage a pin on a registering-wheel of the device, and thereby stop the further rotation thereof in one direction, and an arm for engaging a pin on a ratchet-wheel of a drum, and thereby stop a further rotation of the same, substantially as described.

27. In a register, the combination of a key-bar with projection thereon, an oscillating bar in contact with said projection, weighted arms connected with said bar and on the opposite side of the journal or shaft of the said oscillating bar, a pivoted locking-bolt connected with said arms and adapted to work in an opening in the base of the machine, and the drawer below said base, substantially as described.

28. In a register, the combination of key-bars, an oscillating frame with a cross-bar adapted to contact with said key-bars, and a pivoted lever having its lower end moving in a curved slot in a plate secured to the side of a drawer below the base of said register and its upper end in contact with said cross-bar, so as to lock the same against said key-bars, substantially as described.

29. The combination of a key-bar with a projection, an oscillating bar, a pivoted angle-lever, a base with a curved slot therein, and a drawer with a plate having a slot with a curved portion, as described, substantially as and for the purpose set forth.

30. The combination of a key-bar, an oscillating arm adapted to contact with said key-bar, a pivoted lever having its lower end moving in a cam-plate on a drawer and its upper end adapted to lock said bar in fixed position, so as to lock said key-bar.

31. The combination of a rotary wheel with a projection thereon, a rising and falling rack-bar adapted to move by contact with said pin, a ratchet-wheel engaged by said rack-bar, and an oscillating bar supporting the rack-bar, the said rack-bar having a pin-and-slot connection with the frame of the device or an attachment thereof, substantially as described.

GEORGE F. KOLB.

Witnesses:
JOHN A. WIEDERSHEIM,
WM. C. WIEDERSHEIM.